US009174751B2

(12) United States Patent
Grobbel

(10) Patent No.: US 9,174,751 B2
(45) Date of Patent: Nov. 3, 2015

(54) SEALING DIE ASSEMBLY FOR FORM FILL PACKAGING MACHINE

(71) Applicant: Jason J. Grobbel, Grosse Pointe Park, MI (US)

(72) Inventor: Jason J. Grobbel, Grosse Pointe Park, MI (US)

(*) Notice: Subject to any disclaimer, the term of this patent is extended or adjusted under 35 U.S.C. 154(b) by 517 days.

(21) Appl. No.: 13/672,068

(22) Filed: Nov. 8, 2012

(65) Prior Publication Data

US 2013/0118117 A1    May 16, 2013

Related U.S. Application Data

(60) Provisional application No. 61/558,645, filed on Nov. 11, 2011.

(51) Int. Cl.
*B65B 7/16*    (2006.01)
*B65B 9/04*    (2006.01)
(Continued)

(52) U.S. Cl.
CPC ............... *B65B 7/164* (2013.01); *B29C 65/18* (2013.01); *B29C 65/48* (2013.01); *B29C 65/7841* (2013.01); *B29C 66/112* (2013.01); *B29C 66/131* (2013.01); *B29C 66/53461* (2013.01); *B29C 66/81427* (2013.01); *B29C 66/81431* (2013.01); *B29C 66/81457* (2013.01); *B29C 66/8322* (2013.01); *B29C 66/8324* (2013.01); *B29C 66/849* (2013.01); *B65B 7/00* (2013.01); *B65B 9/04* (2013.01); *B65B 9/045* (2013.01);
(Continued)

(58) Field of Classification Search
CPC ........ B65B 51/30; B65B 51/14; B65B 47/06; B65B 47/02; B65B 47/00; B65B 41/14; B65B 31/028; B65B 31/021; B65B 9/045; B65B 9/04; B65B 7/164; B65B 7/00; B29C 66/849; B29C 66/24244; B29C 66/8322; B29C 66/53461; B29C 66/244; B29C 66/112; B29C 66/131
USPC .......... 53/511, 559, 246, 329.2, 329.3, 374.8, 53/374.9
See application file for complete search history.

(56) References Cited

U.S. PATENT DOCUMENTS

| 2,712,717 A | * | 7/1955 | Keller | 53/453 |
| 3,048,952 A | * | 8/1962 | Paal | 53/559 |

(Continued)

FOREIGN PATENT DOCUMENTS

| CA | 2265225 A1 | * | 9/2000 | B65B 7/164 |
| DE | 1958951 A1 | * | 9/1970 | B65B 51/14 |

(Continued)

OTHER PUBLICATIONS

Drawing of a gasket used more than one year prior to the filing of U.S. Appl. No. 61/558,641, filed Nov. 11, 2011, 1 page.

*Primary Examiner* — Stephen F Gerrity
(74) *Attorney, Agent, or Firm* — Dykema Gossett PLLC

(57) ABSTRACT

A sealing die assembly for a form fill packaging machine is disclosed. The sealing die assembly may have a forming station, a loading station, a sealing station, and a cutting station. The sealing station may contain a sealing die box and a sealing die head that come together to secure pieces of packing material around a product. To minimize the amount of scrap that the sealing die assembly produces, the die box may have one or more protrusions that extend in a longitudinal direction and provide surface area. The one or more protrusions may be configured so as not to interfere with the longitudinal spacing of one or more cavities that may be formed in the packing material.

12 Claims, 3 Drawing Sheets

(51) Int. Cl.
  *B65B 51/14* (2006.01)
  *B65B 7/00* (2006.01)
  *B65B 31/02* (2006.01)
  *B29C 65/18* (2006.01)
  *B29C 65/48* (2006.01)
  *B29C 65/78* (2006.01)
  *B29C 65/00* (2006.01)

(52) U.S. Cl.
  CPC ............ *B65B 31/021* (2013.01); *B65B 31/028* (2013.01); *B65B 51/14* (2013.01)

(56) References Cited

U.S. PATENT DOCUMENTS

| | | | |
|---|---|---|---|
| 3,468,096 A * | 9/1969 | Franz | 53/450 |
| 3,474,591 A * | 10/1969 | Harder | 53/511 |
| 3,524,298 A * | 8/1970 | Hamilton | 53/433 |
| 3,555,779 A * | 1/1971 | Nemer | 53/374.8 |
| 3,653,175 A * | 4/1972 | Rogiers | 53/559 |
| 3,664,085 A * | 5/1972 | Rousseau et al. | 53/510 |
| 3,685,251 A * | 8/1972 | Mahaffy et al. | 53/559 |
| RE29,937 E * | 3/1979 | Mahaffy et al. | 53/511 |
| 4,294,056 A * | 10/1981 | Paulsen et al. | 53/86 |
| 4,295,908 A * | 10/1981 | Schaefer et al. | 156/251 |
| 4,490,963 A * | 1/1985 | Knudsen | 53/559 |
| 4,555,894 A * | 12/1985 | Illy | 53/528 |
| 4,624,099 A * | 11/1986 | Harder | 53/432 |
| 4,748,797 A * | 6/1988 | Martin | 53/432 |
| 4,811,550 A * | 3/1989 | Hautemont | 53/478 |
| 4,819,406 A * | 4/1989 | Redmond | 53/51 |
| 4,819,413 A * | 4/1989 | Mancini | 53/478 |
| 4,909,022 A * | 3/1990 | Kubis et al. | 53/510 |
| 5,105,603 A * | 4/1992 | Natterer | 53/412 |
| 5,626,000 A * | 5/1997 | Edwards et al. | 53/281 |
| 5,791,120 A * | 8/1998 | De Young | 53/329.3 |

FOREIGN PATENT DOCUMENTS

| | | | | |
|---|---|---|---|---|
| FR | 2419808 | A1 * | 10/1979 | B65B 9/04 |
| FR | 2678900 | A1 * | 1/1993 | 53/329.3 |
| FR | 2903078 | A1 * | 1/2008 | B65B 7/164 |
| FR | 2914278 | A1 * | 10/2008 | B65B 31/028 |

\* cited by examiner

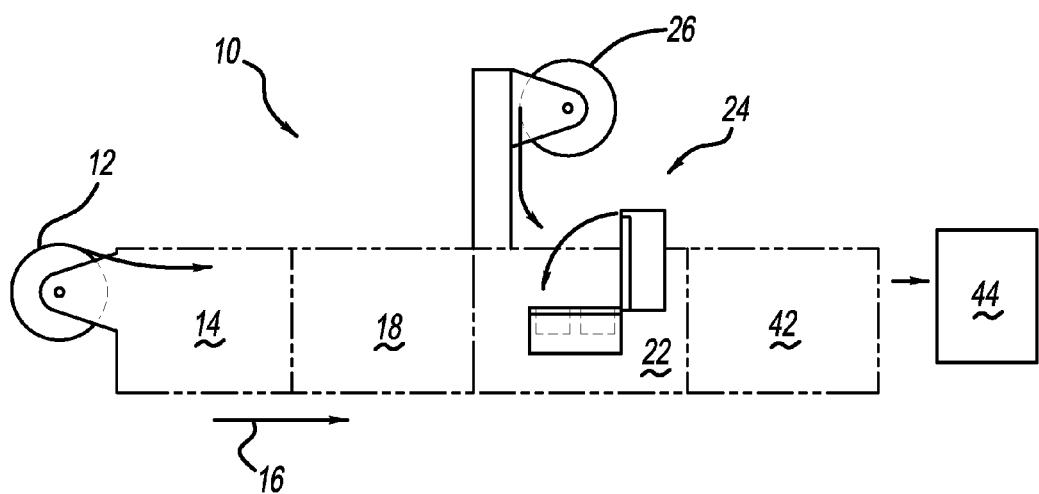
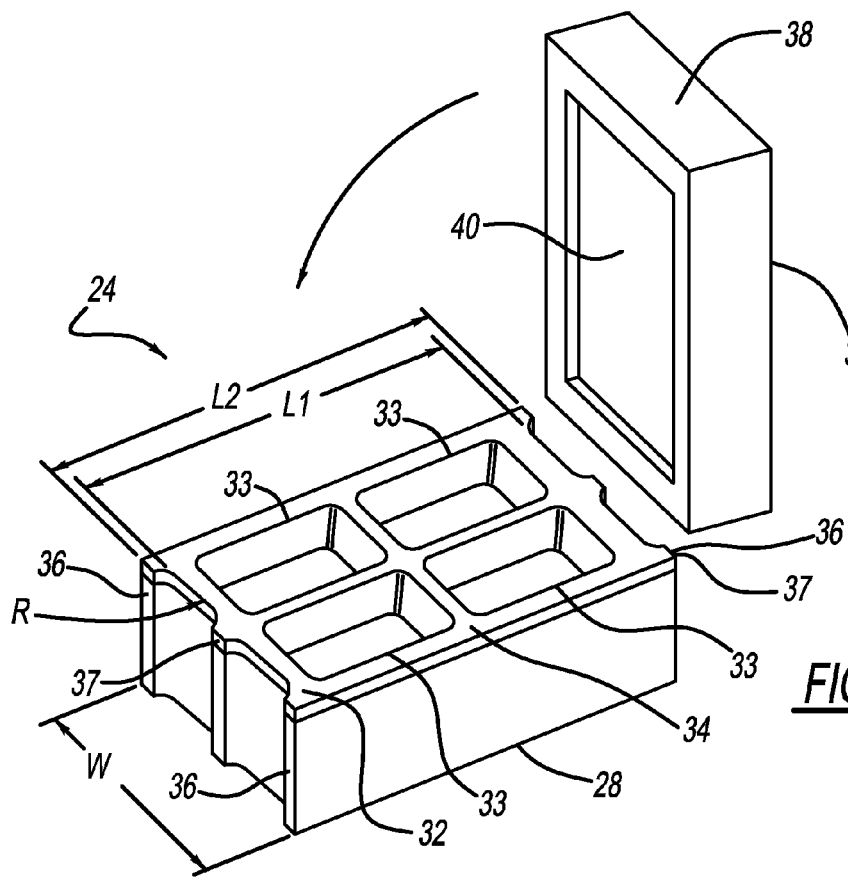

SEALING DIE ASSEMBLY FOR FORM FILL PACKAGING MACHINE

CROSS-REFERENCE TO RELATED APPLICATION

This application claims the benefit of U.S. Provisional Application No. 61/558,645 filed Nov. 11, 2011, which is hereby incorporated by reference in its entirety.

FIELD OF THE DISCLOSURE

This disclosure relates generally to a sealing die assembly for a form fill packaging machine which minimizes scrap produced from packaging material.

BACKGROUND

Form fill packaging machines for forming, filling, and sealing flexible pouches containing products are used throughout the world. These machines provide the ability to package products along a continuous assembly line using heat seal wrapping material films, which are formed and then sealed around the product. These machines are used in many industries, including, but not limited to, the food industry, medical industry, textile industries, and the consumer products industry.

Generally, a form fill packaging machine may be comprised of indexed stations, each station performing a particular task. For example, in a forming station, a bottom film of the heat seal wrapping material may come off a continuous roll. The forming station will heat the bottom film to create a predefined cavity shape which may comprise a plurality of cavities. The bottom film may then be indexed to a loading station while still connected to the continuous roll. At the loading station, product may be placed in the cavity. The bottom film with the product positioned in the cavity may then be indexed to a sealing station. At the sealing station, a top film of the heat seal wrapping material coming off a different continuous roll is placed over the bottom film. A sealing die assembly then compresses the top film to the bottom film while applying heat, and if applicable, evacuating air around the product to form a vacuum seal around the product. The heat and pressure attaches the top film to the bottom film. The now attached top and bottom films with the sealed product are then indexed to a cutting station where the top and bottom films are cut off from their respective rolls.

The sealing die assembly used at the sealing station must apply a large amount of force to attach the top film to the bottom film. One drawback of these types of assemblies is that as a result of the required force, a sealing gasket located between a sealing die box and a sealing head must have enough surface contact area to offset the forces applied by and between the sealing die box and sealing head. Manufacturers of form fill packaging machines have generally added surface contact area to the sealing gasket by widening the sealing die box, sealing head, and sealing gasket in the direction perpendicular to the directional path the top and bottom films are indexed along, also known as the longitudinal path. This solution, however, results in a requirement for wider top and bottom film rolls which will thereby result in additional scrap material when the attached top and bottom films are cut off from the respective continuous rolls.

SUMMARY

It may be desirable to have a sealing die assembly of a form fill packaging machine that minimizes the required width of heat seal wrapping material film rolls, which would reduce the amount of scrap created and the material cost associated with that scrap.

The disclosed form fill packaging machine may in some embodiments include numerous stations. For example, the form fill packaging machine may include a forming station, a loading station, a sealing station, and a cutting station. The forming station may be where the form fill packaging machine forms packaging material into a predefined shape having a plurality of cavities. The form fill packaging machine may then place one or more types of product into the plurality of cavities at the loading station. The sealing station, moreover, may include a sealing die assembly. The sealing die assembly may include a sealing die box and a sealing die head that cooperate to help secure the packaging material around the product. Further, the form fill packaging machine may separate the packaging material into individual packages at the cutting station.

To index or otherwise move the packaging material from one station to another, a plurality of clamps may be utilized in some embodiments. The packaging material may be a multi-layer plastic film or a heat seal wrapping material, for instance. At times, the present disclosure refers collectively to multiple plastic films as the packaging material. Also, in some embodiments the packaging material may include an adhesive layer for bonding purposes.

With respect to the sealing station in particular, a sufficient amount of surface area may be required where both the sealing die head and the sealing die box contact the packaging material from above and below, respectively. The sealing die box may have a number of sides that support, at least in part, a top surface. The sealing die box may be said to have a length and a width, and a longitudinal direction may be said to extend generally parallel to the length of the sealing die box. It should be understood that in many contexts the longitudinal "direction" referenced in this description and the claims is in fact a bidirectional reference, such as a longitudinal axis, for example. In some embodiments, the packaging material is selectively indexed along the longitudinal direction in relation to the sealing die box. Further, the sealing die box may be configured to receive packaging material having a plurality of cavities, which may have been formed at the forming station. More specifically, the sealing die box may have one or more pockets that are capable of receiving the plurality of cavities of the packaging material.

Further yet, the sealing station may include a number of protrusions that extend from the sealing die box in the longitudinal direction. The protrusions may form at least one recess along one or more sides of the sealing die box. In some embodiments, the recesses are formed along sides of the sealing die box that are generally normal to the longitudinal direction. The recesses may receive portions of cavities of the packaging material that are next to enter the sealing die box. In the alternative or in addition, other recesses may receive portions of cavities of the packaging material that have just exited the sealing die box. Thus the width of the sealing die box may be minimized since the surface area of the top surface is maximized in the longitudinal direction, as the protrusions contribute to the surface area of the top surface. More importantly, the surface area of the top surface is maximized in the longitudinal direction without requiring additional clearance between longitudinally-spaced cavities in the packaging material.

To help maximize the surface area of the top surface, the recesses may have contours that are substantially similar to portions of the contours of the pockets of the sealing die box. As a further way of maximizing the surface area of the top surface, the spacing between a recess and a pocket within the sealing die box may be optimized. For example, if the sealing die box contains two longitudinally-spaced pockets, the top surface may be constructed such that the longitudinal space between the recess and the die box is substantially equal to the longitudinal space between the two longitudinally-spaced pockets. Thus the longitudinal spacing between the cavities of the packaging material need not change or be increased.

The sealing head may have generally the same width and the same length as the sealing die box. The sealing head may be configured to compress, bond, or compress and bond the packaging material disposed between the sealing head and the sealing die box. In some embodiments, the sealing head may be rotated towards and away from the sealing die box. In other embodiments, the sealing head may travel up and down. While similar movements are contemplated with the sealing die box, the sealing die box travels up and down in most embodiments. The up and down movement in some embodiments of the sealing head and the sealing die box may be characterized as generally perpendicular to the packaging material.

In some embodiments, the sealing die assembly may have a sealing gasket disposed on the top surface. In the alternative, the top surface may be said to comprise a sealing gasket. The sealing gasket may be affixed to the top surface, for example, by engaging a rib within a slot or channel on the sealing die box or top surface. The sealing gasket may be softer than other parts of the sealing die box, which may in turn help facilitate producing pouches that secure product in an airtight manner.

BRIEF DESCRIPTION OF THE DRAWINGS

FIG. 1 is a side view of an embodiment of an exemplary form fill packaging machine;

FIG. 2 is an isometric view of an exemplary sealing die assembly of a form fill packaging machine with a sealing head in an open position;

DETAILED DESCRIPTION

Figure 3:
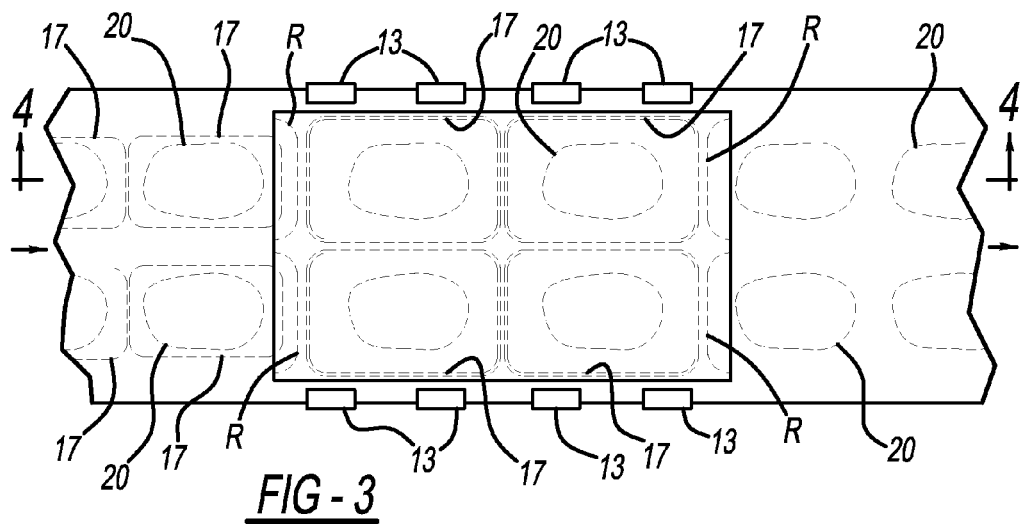
FIG. 3 is a top view of the sealing die assembly illustrated in FIG. 2 with the sealing head in a closed position and with partial views of the top and bottom films entering and exiting the sealing die assembly.

Referring now to the drawings wherein like reference numerals are used to identify identical components in the various views, FIG. 1 generally illustrates an exemplary embodiment of a horizontal form fill packaging machine 10. As will be described below, the form fill packaging machine 10 may comprise a plurality of stations 14, 18, 22, 42, where each station may be configured to perform a particular task. It should be understood that FIG. 1 is primarily a schematic diagram, even though the schematic for one station includes an overlay of a sealing die assembly in basic side view.

A bottom film 12 provided from a roll of packaging material may be fed through the form fill packaging machine 10. The bottom film 12 may have a top side, a bottom side, and two edges. As shown in FIG. 3, a plurality of clamps 13 may hold the bottom film 12 near each edge of the bottom film 12. The plurality of clamps 13 may remain engaged to the bottom film 12 and transfer the bottom film 12 from station to station. In an exemplary embodiment, the plurality of clamps 13 are positioned via a chain drive system. The transfer of the bottom film 12 may be indexed, or in other words, stopping the bottom film 12 in each station to perform the particular task and then moving the bottom film 12 to the next station after the task is complete. The bottom film 12 may be comprised of a heat seal wrapping (or "packaging") material as known by those with skill in the art. For example, the material of the bottom film 12 may include, but is not limited to, a plastic film. The plastic film may be a monolayer thermoplastic or may be comprised of multiple layers, where each layer in the multilayer film may provide a different function. In an exemplary embodiment, a multilayer plastic film may have, but is not limited to, a thermoplastic substrate layer for structure, a gas barrier layer, an oxygen barrier layer, a moisture barrier layer, an aroma barrier layer, a layer that may allows printing onto its surface, and an adhesive layer for bonding purposes. The bottom film 12 may be transparent, semi-transparent, or opaque.

A first station of the form fill packaging machine may be configured as a forming station 14. The bottom film 12 may be indexed to the forming station 14 along a longitudinal path 16 of the form fill packaging machine 10. The forming station 14 may cause the bottom film 12 to take the form of a predefined shape. The predefined shape may include, but is not limited to, a cavity 17 or plurality of cavities 17. The forming station 14 may use heat to relax the plastic for easier formation of the predefined shape or other methods as known by those with skill in the art.

Figure 4:
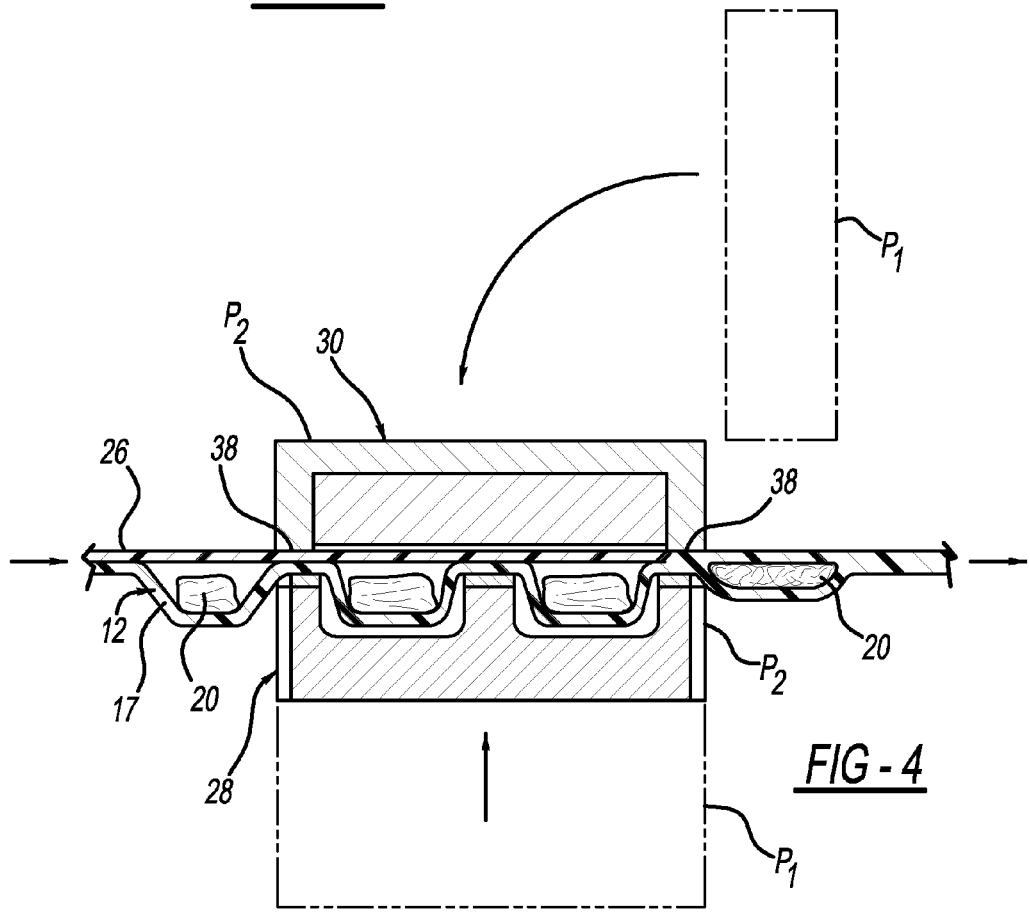
FIG. 4 is a cross sectional view of the sealing die assembly of FIG. 3 taken along the line 4-4 in FIG. 3 with the sealing head in a closed position and with partial views of the top and bottom films entering and exiting the sealing die assembly.

After forming the bottom film 12 into a predefined shape having one or more cavities 17, the bottom film 12 may be indexed to a loading station 18. At the loading station 18, a product 20, as shown in FIGS. 3-4, may be positioned in or mostly in a cavity 17 of the bottom film 12. At this station, the product 20 may still be unsealed. In an embodiment where the bottom film 12 has a single cavity 17, the product 20 may be placed in the single cavity 17. In another embodiment where the bottom film 12 has multiple formed cavities 17, the product 20 may be placed in each separate cavity 17. For example, if the bottom film 12 has four cavities 17, the product 20 may be placed in each of the four cavities 17. In either embodiment, the placement of the product 20 may be automated or may be manually placed by an operator.

In still other embodiments, there may be multiple loading stations to accommodate loading of more than one type of product. At some loading stations, for example, one type of product may be placed in one or more cavities 17. At other loading stations, another type of product may be placed in one or more other cavities 17. It is further contemplated that numerous loading stations could load different types of product into the same cavity 17, such as where the end product includes pouches containing more than one type of product.

After the product 20 has been positioned in the cavity 17 or cavities 17 of the bottom film 12, the bottom film 12 with product 20 may be indexed to a sealing station 22. As the bottom film 12 with product is indexed, a top film 26, having a top side, bottom side, and two edges, is also indexed to the sealing station 22. The top film 26 may be provided from another roll of packaging material, similar to the bottom film 12. The top film 26 may be positioned over or above both the bottom film 12 and product 20 and held by the same plurality of clamps 13 that are holding the bottom film 12. The top film 26 may be comprised of the same material as the bottom film 12. In another embodiment, however, the top film 26 may be comprised of a different material for cosmetic purposes, functional purposes, or other purposes as known by those with skill in the art.

Referring to FIGS. 1-4, in an exemplary embodiment, the sealing station 22 may include a sealing die assembly 24. The sealing die assembly 24 may include a sealing die box 28, a sealing head 30, and a sealing gasket 32. After the bottom film 12, the product 20, and the top film 26 are indexed to the sealing station 22, the sealing die box 28 may be positioned from a first position $P_1$ to a second position $P_2$. The first position $P_1$ of the sealing die box 28 may allow the sealing die box 28 to provide clearance to the bottom film 12, the product 20, and the top film 26 as they are indexed from station to station. The second position $P_2$ of the sealing die box 28 allows the sealing die box 28 to engage the bottom film 12. In an exemplary embodiment with a horizontal form fill packaging machine, the movement of the sealing die box 28 may be a vertical motion. In another exemplary embodiment with a vertical form fill packaging machine, the movement of the sealing die box may be a horizontal motion. After the sealing process has occurred, the sealing die box 28 may be positioned from the second position $P_2$ back to the first position $P_1$. The sealing die box 28 may have a corresponding pocket 33, or plurality of pockets 33, to match the predefined shape (e.g., the cavity 17 or plurality of cavities 17) of the bottom film 12 in which the product 20 is positioned. For example, in an embodiment where the bottom film 12 has four cavities 17, which contain four products 20, the sealing die box 28 may have four corresponding pockets 33 to accommodate the four cavities 17.

When the sealing die box 28 is sealed, such as by the sealing head 30 described below, the pockets 33 of the sealing die box 28 may be substantially airtight, may allow air to be removed to create a vacuum, or may allow the air to be replaced with a different gas, such as, but not limited to, an inert gas. The pockets 33 of the sealing die box 28 may have ports which may be used to control the atmosphere in the pockets 33 and in the atmosphere around the product 20 located between the top film 26 and the bottom film 12. To facilitate a substantially airtight seal, the sealing gasket 32 (described below) may be disposed on a top surface 34 of the sealing die box 28.

The sealing die box 28 may have a width "W" and a length "L1." In some embodiments, the width W of the sealing die box 28 may be smaller than the width of the top and bottom films 26, 12 to allow the plurality of clamps 13 to engage the films 26, 12 near the edges for supporting and indexing purposes (e.g., moving the films 26, 12 and product 20 from station to station). In other words, the films 26, 12 may extend beyond each side of the sealing die box 28 as shown in FIG. 3. As briefly described above, the sealing die box 28 may have a top surface 34. The initial surface area of the top surface 34 may be defined by the width W multiplied by the length L1 minus the surface area corresponding to the pockets 33. The top surface 34 may be substantially flat. As described above, the sealing gasket 32 may be disposed on top surface 34 and in some embodiments may be referred to as the top surface 34.

It should be understood that the present invention has applicability in a multitude of embodiments. For example, the present invention may be utilized in manufacturing new sealing gaskets so as to minimize the amount of scrap packaging material that is produced as a byproduct of forming sealed pouches. As a further example, the present invention may be utilized where the sizes of the pockets 33 within the sealing die box 28 have been expanded and the surface area of the sealing gasket 32 has been thereby reduced.

With respect to the latter example, to increase the amount of surface area of the sealing gasket 32 after pockets 33 within the sealing die box 28 have been enlarged, the sealing die box 28 and corresponding sealing gasket 32 may be extended in one or a plurality of select areas from the length L1 to a length "L2," creating one or a plurality of protrusions 36. Adding the protrusions 36 thus distributes the force exerted on the sealing gasket 32, which provides the same or a similar surface area as existed before the pockets 33 were enlarged. Further, in an exemplary embodiment, a sealing die box 28 may have six protrusions 36 as shown in FIG. 2, for example. While a detailed example has been provided, it will be appreciated that any number of protrusions 36 may be used to increase the surface area of the top surface 34 of the sealing die box 28 and the surface area of the corresponding sealing gasket 32 which substantially matches the top surface 34. By partially extending the length of the sealing die box 28, one or more recesses R provide clearance to the top film 26, the bottom film 12, and the product 20 that are awaiting to be indexed to the sealing station 22 or have already been sealed and indexed toward the next station as shown in FIG. 4. Additionally, by not expanding the width W of the sealing die box 28 to create a larger surface area for the sealing gasket 32, the widths of the top film 26 and bottom film 12 may be minimized, thus reducing material cost and scrap of the top film 26 and bottom film 12 produced during the packaging process. The sealing die box 28 may be comprised of aluminum, steel, or any other type of material known to those with skill in the art which may maintain structural rigidity against the large forces encountered during the sealing process.

In an exemplary embodiment, the length L2 may be 6 to 8% longer than L1. Each protrusion 36 may have an edge 37 having an edge length approximately the same distance as the portion of the top surface 34 between the pockets 33. For example, in one embodiment, L1 may be 612.8 mm and L2 may be 656.8 mm. In other words, each protrusion 36 may be 22 mm, extending the overall new length L2 by 44 mm. The end of the edge of each protrusion 36 may be transitioned to a curved portion which may be connected to the side of the sealing die box 28. In an exemplary embodiment, the curved portion of the recess R may have a radius of 28.6 mm. The curved transition of the protrusion 36 may be substantially similar to a curved corner of the pockets 33 in the sealing die box 28. Further, the recess R or recesses R formed by the protrusions may have contours that are substantially similar to a portion of a contour of at least one pocket 33 of the sealing die box 28.

Moreover, in one embodiment, the amount of longitudinal space between the recesses R and the pockets 33 may equal the amount of longitudinal space between multiple longitudinally-spaced pockets 33 within the sealing die box 28. As a result, the spacing between each longitudinally-spaced cavity 17 in the bottom film 12 may be equal. Equal spacing of cavities 17 may offer further efficiencies at the forming station 14 and may further reduce scrap material.

The sealing head 30 may be positioned from a first position $P_1$ to a second position $P_2$. The first position $P_1$ of the sealing head 30 allows the sealing head 30 to provide clearance to the top film 26 and also provides a more convenient position for maintenance of the various components of the sealing die assembly 24. During operation of the form fill packaging machine 10, the sealing head 30 may remain in the second position $P_2$ during the sealing process. While in the second position $P_2$, a bottom surface 38 of the sealing head 30 is substantially parallel to the top surface 34 of the sealing die box 28. In an exemplary embodiment, the outer perimeter of the bottom surface 38 of the sealing head 30 may substantially overlap the top surface 34 of the sealing die box 28 and the sealing gasket 32, including the extra surface created by the plurality of protrusions 36.

During the sealing process, the outer perimeter of the bottom surface 38 of the sealing head 30 may contact the top film 26 and the sealing gasket 32 located on the top surface 34 of the sealing die box 28 may contact the bottom film 12. Portions of the top film 26 and portions of the bottom film 12 may be compressed together between the bottom surface 38 of the sealing head 30 and the sealing gasket 32 located on the top surface 34 of the sealing die box 28. The compression force may create a substantially airtight seal. After the substantially airtight seal is created, the atmosphere in the pockets 33 of the sealing die box 28 and the atmosphere surrounding the product 20 located between the top film 26 and the bottom film 12 may be evacuated and if desired, replaced with a different atmosphere. Afterwards, a heat plate 40 located on the sealing head may press down on portions of the top film 26 with a predefined force creating a compression force between the sealing head 30, the sealing gasket 32 disposed on the top surface 34, and the sealing die box 28. The heat plate 40 may be at a temperature hot enough, as known by those with skill in the art, to activate heat-activated adhesives integrated in the top film 26 and bottom film 12, which may effectively or further bond or join the two films 12, 26 together.

The sealing gasket 32 may have a top side, a bottom side, and a thickness between the top and bottom sides. The sealing gasket 32 is located on and may be affixed to the top surface of the sealing die box 28, such that the bottom side of the sealing gasket 32 is contacting the top surface 34 of the sealing die box 28. The shape of the top side and bottom side of the sealing gasket 32 may substantially match the top surface 34 of the sealing die box 28, as shown in FIG. 2. The sealing gasket 32 may have a texture on its surface to improve the release of the bottom film 12 from the sealing gasket 32 as well as other functions known to those with skill in the art. The sealing gasket 32 may also have a locating feature positioned on the bottom side of the sealing gasket 32. In an exemplary embodiment, the locating feature may be a rib that is positioned in a corresponding slot feature on the top surface 34 of the sealing die box 28. In an exemplary embodiment, the thickness may be approximately 3 mm. It will be appreciated, however, that the sealing gasket 32 may have a thickness that is greater or less than that described here, and such sealing gaskets 32 remain within the spirit and scope of the present disclosure. The sealing gasket 32 may be comprised of silicon, silicon rubber, ethylene propylene diene monomer (EPDM), plastic, and other high pressure sealing materials as known to those with skill in the art. To improve the life and overall performance of the sealing gasket 32, the sealing gasket 32 may have as large a surface area as possible. However, as the surface area of the gasket 32 increases, the amount of top film 26 and bottom film 12 that is wasted as scrap also increases. By minimizing the width W of the sealing die box 28 and extending portions of the length of the sealing die box from the length L1 to the length L2 along the longitudinal path of the form fill packaging machine 10, the forces exerted on the sealing gasket 32 may be better distributed without having to increase the width of the top surface 34 and the corresponding sealing gasket 32. This may result in longer life and better performance of the sealing gasket 32 without requiring wider top and bottom films 26, 12.

After the sealing process is completed, the bonded top and bottom films 26, 12 with the sealed product 20 may be indexed to a cutting station 42. At the cutting station 42, the top and bottom films 26, 12 are cut from the respective continuous rolls into individual packages. For example, in an exemplary embodiment where four products are processed at the same as shown in FIGS. 2 and 3, the cutting station 42 would cut four individual packages 44, where each individual package 44 would contain a sealed product between the bonded top and bottom films 26, 12.

Figure 5:
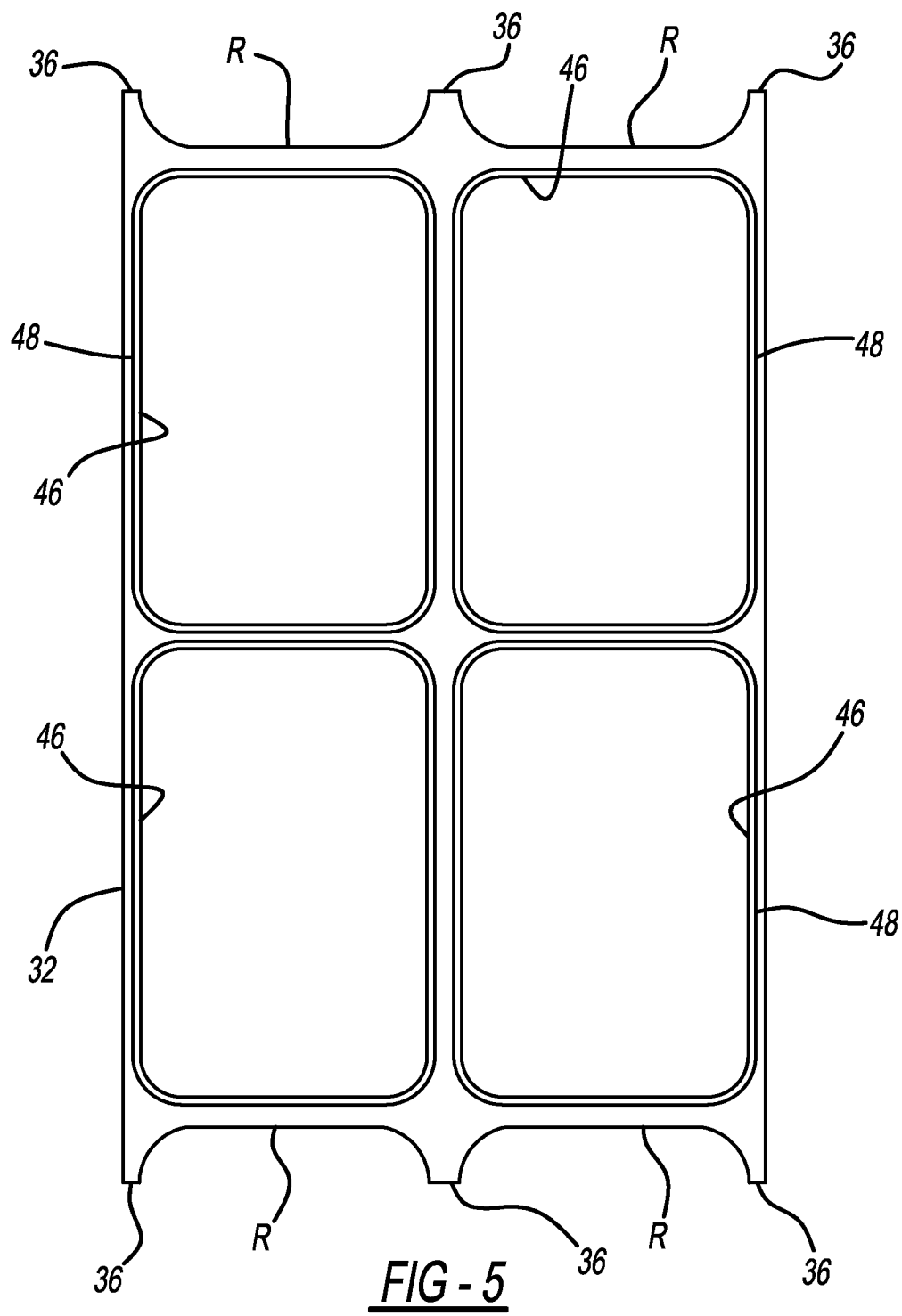
FIG. 5 is a top view of an exemplary gasket for the form fill packaging machine.

Turning now to FIG. 5, an exemplary embodiment of the sealing gasket 32 is shown in top view. The sealing gasket 32 may include a number of recesses R and protrusions 36 as described above. In some embodiments, the sealing gasket 32 may have openings 46 that provide ingress to and egress from the pockets (not shown) of the die box (not shown). The openings 46 may be curved or tapered 48 to provide additional ingress to and egress from the pockets. In other embodiments, however, the sealing gasket 32 may not necessarily have openings 46. Instead, the sealing gasket 32 may have additional material that occupies surfaces within the pockets of the die box.

Although certain exemplary embodiments have been described above with a certain degree of particularity, those skilled in the art could make numerous alterations to the disclosed embodiments without departing from the scope of this disclosure. Additionally, all directional references (e.g., up, down, left, right) are only used for identification purposes to aid the reader's understanding of the present disclosure, and do not create limitations, particularly as to the position, orientation, or use of the embodiments described in this disclosure. Joinder references (e.g., attached, bonded, connected, and the like) are to be construed broadly and may include intermediate members between a connection of elements and relative movement between elements. As such, joinder references do not necessarily infer that two elements are directly connected/coupled and in fixed relation to each other. It is intended that all matter contained in the above description or shown in the accompanying drawings shall be interpreted as illustrative only and not limiting. Changes in detail or structure may be made without departing from the scope and spirit of this disclosure as defined in the appended claims.

What is claimed is:

1. A sealing die assembly for use in a form fill packaging machine, the sealing die assembly comprising:
   a sealing die box having a top surface, the sealing die box having a length oriented in a longitudinal direction;
   a sealing head configured to compressively bond a pair of packaging films located between the top surface of the sealing die box and the sealing head;
   wherein a surface area of the top surface of the sealing die box is increased by a plurality of protrusions extending the length of the sealing die box in a longitudinal direction and a plurality of recesses configured to provide clearance to a lower formation located on at least one of the pair of packaging films; and
   wherein the sealing die box has at least two longitudinally-spaced pockets for receiving the lower formation located on a bottom film of the pair of packaging films, wherein a longitudinal space between a first recess and one of the at least two longitudinally-spaced pockets is substantially equal to a longitudinal space between the at least two longitudinally-spaced pockets of the sealing die box.

2. The sealing die assembly of claim 1, further comprising a sealing gasket located between the sealing die box and the sealing head.

3. The sealing die assembly of claim 2, wherein the sealing gasket has a profile shape substantially similar to the top surface of the sealing die box.

4. The sealing die assembly of claim 2, wherein the sealing gasket comprises silicon, silicon rubber, or ethylene propylene dien monomer.

5. The sealing die assembly of claim 1, wherein the sealing die box has six protrusions.

6. The sealing die assembly of claim 1, wherein the sealing die box has four recesses.

7. The sealing die assembly of claim 1, wherein the at least two longitudinally-shaped pockets are configured to receive the lower formation located on at least one of the pair of packaging films.

8. The sealing die assembly of claim 7, wherein a contour of the recess is substantially similar to a portion of a contour of a pocket of the at least two longitudinally-shaped pockets.

9. The sealing die assembly of claim 1, wherein the sealing die box has two recesses located between three protrusions on two sides of the sealing die box.

10. The sealing die assembly of claim 1, wherein the length of the sealing die box in the longitudinal direction is greater than a width of the sealing die box in a lateral direction.

11. The sealing die assembly of claim 1, wherein a length of sealing head is substantially the same length or longer as the sealing die box.

12. A sealing die assembly for use in a form fill packaging machine, the sealing die assembly comprising:
- a sealing die box having a top surface, the sealing die box having a length oriented in a longitudinal direction;
- a sealing head configured to compressively bond a pair of packaging films located between the top surface of the sealing die box and the sealing head;
- wherein a surface area of the top surface of the sealing die box is increased by a plurality of protrusions extending the length of the sealing die box in a longitudinal direction and a plurality of recesses configured to provide clearance to a lower formation located on at least one of the pair of packaging films;
- wherein the sealing die box has at least two longitudinally-spaced pockets for receiving the lower formation located on a bottom film of the pair of packaging films, wherein a longitudinal space between a first recess and one of the at least two longitudinally-spaced pockets is substantially equal to a longitudinal space between the at least two longitudinally-spaced pockets of the sealing die box; and
- wherein the first recess is disposed along a first side of the sealing die box and a second recess is disposed along a second side of the sealing die box, the first and second sides of the sealing die box generally opposing one another.

\* \* \* \* \*